(12) United States Patent
Hennessy et al.

(10) Patent No.: US 8,887,888 B2
(45) Date of Patent: Nov. 18, 2014

(54) INTEGRATED VISCOUS CLUTCH

(75) Inventors: David R. Hennessy, Burnsville, MN (US); Thomas Schmidt, Eden Prairie, MN (US); Scott Miller, Minneapolis, MN (US)

(73) Assignee: Horton, Inc., Roseville, MN (US)

( * ) Notice: Subject to any disclaimer, the term of this patent is extended or adjusted under 35 U.S.C. 154(b) by 246 days.

(21) Appl. No.: 13/509,856

(22) PCT Filed: Nov. 15, 2010

(86) PCT No.: PCT/US2010/056659
§ 371 (c)(1),
(2), (4) Date: May 15, 2012

(87) PCT Pub. No.: WO2011/062856
PCT Pub. Date: May 26, 2011

(65) Prior Publication Data

US 2012/0279820 A1   Nov. 8, 2012

Related U.S. Application Data

(60) Provisional application No. 61/261,965, filed on Nov. 17, 2009.

(51) Int. Cl.
*F16D 35/02*   (2006.01)

(52) U.S. Cl.
CPC .......... *F16D 35/024* (2013.01); *F16D 2300/18* (2013.01)
USPC .................................... 192/58.61; 192/30 W

(58) Field of Classification Search
CPC ..... F16D 35/02; F16D 35/021; F16D 35/024; F16D 35/028
USPC ....................................................... 192/58.61
See application file for complete search history.

(56) References Cited

U.S. PATENT DOCUMENTS

| | | | |
|---|---|---|---|
| 923,565 | A | 6/1909 | Newcomb |
| 2,629,472 | A | 2/1953 | Sterner |

(Continued)

FOREIGN PATENT DOCUMENTS

| | | |
|---|---|---|
| CN | 201190592 Y | 2/2009 |
| CN | 101400916 A | 4/2009 |

(Continued)

OTHER PUBLICATIONS

International Search Report and Written Opinion from PCT Application Serial No. PCT/US2010/056659, filed Nov. 15, 2010.

(Continued)

*Primary Examiner* — Richard M. Lorence
(74) *Attorney, Agent, or Firm* — Kinney & Lange, P.A.

(57) ABSTRACT

A viscous clutch (30; 30') includes a stationary journal bracket (32; 32') defining a mounting shaft (32-1; 32-1'), an output member (34; 34') rotatably supported on the mounting shaft about an axis (A), an input member (34; 34') rotatably supported on the mounting shaft about the axis, and a working chamber (50; 50') defined between the input member and the output member to selectively transmit torque there between when a shear fluid is present. The mounting shaft extends axially through the viscous clutch from a front face (62; 62') of the viscous clutch to a rear face (56; 56') of the viscous clutch, with the rear face defining a mounting surface for mounting the viscous clutch at a mounting location. The front and rear faces are located at opposite sides of the viscous clutch and face in opposite directions.

25 Claims, 4 Drawing Sheets

(56) References Cited

U.S. PATENT DOCUMENTS

| | | |
|---|---|---|
| 2,902,127 A | 9/1959 | Hardy |
| 3,101,825 A | 8/1963 | Caroli et al. |
| 3,215,235 A | 11/1965 | Kamm |
| 3,319,754 A | 5/1967 | Kokochak et al. |
| 3,380,565 A | 4/1968 | Wilkinson |
| 3,404,832 A | 10/1968 | Sutaruk |
| 3,648,811 A | 3/1972 | LaFlame |
| 3,893,555 A | 7/1975 | Elmer |
| 4,046,239 A | 9/1977 | Tinholt |
| 4,246,995 A | 1/1981 | Gee |
| 4,271,945 A | 6/1981 | Budinski |
| 4,281,750 A | 8/1981 | Clancey |
| 4,305,491 A | 12/1981 | Rohrer |
| 4,355,709 A | 10/1982 | Light |
| 4,362,226 A | 12/1982 | Gee |
| 4,405,039 A | 9/1983 | Hauser |
| 4,526,257 A | 7/1985 | Mueller |
| 4,556,138 A | 12/1985 | Martin et al. |
| 4,579,206 A * | 4/1986 | Velderman et al. ........ 192/58.63 |
| 4,658,671 A | 4/1987 | Martin |
| 4,676,355 A | 6/1987 | Brunken et al. |
| 4,727,969 A * | 3/1988 | Hayashi et al. ............ 192/58.66 |
| 4,779,323 A | 10/1988 | Bloemendaal |
| 4,893,703 A | 1/1990 | Kennedy et al. |
| 4,987,986 A | 1/1991 | Kennedy et al. |
| 5,152,383 A | 10/1992 | Boyer et al. |
| 5,226,517 A | 7/1993 | Grochowski |
| 5,511,643 A | 4/1996 | Brown |
| 5,722,523 A | 3/1998 | Martin |
| 5,893,442 A * | 4/1999 | Light ......................... 192/58.61 |
| 5,896,964 A | 4/1999 | Johnston et al. |
| 5,937,983 A | 8/1999 | Martin et al. |
| 5,992,594 A | 11/1999 | Herrle et al. |
| 6,026,943 A | 2/2000 | Fuchs et al. |
| 6,032,775 A | 3/2000 | Martin |
| 6,173,492 B1 | 1/2001 | Moser |
| 6,419,064 B1 | 7/2002 | Krammer |
| 6,443,283 B1 | 9/2002 | Augenstein et al. |
| 6,530,462 B2 | 3/2003 | Lutz |
| 6,550,596 B2 | 4/2003 | Shiozaki et al. |
| 6,695,113 B2 | 2/2004 | Lutz |
| 6,725,812 B1 | 4/2004 | Scott |
| 6,935,478 B2 | 8/2005 | Dräger et al. |
| 7,047,911 B2 | 5/2006 | Robb et al. |
| 7,083,032 B2 | 8/2006 | Boyer |
| 7,178,656 B2 | 2/2007 | Pickelman et al. |
| 7,191,883 B2 | 3/2007 | Angermaier |
| 7,828,529 B2 * | 11/2010 | Baumgartner et al. ....... 417/223 |
| 2002/0014804 A1 * | 2/2002 | Nelson et al. ............... 310/67 R |
| 2004/0084273 A1 | 5/2004 | May et al. |
| 2004/0124057 A1 | 7/2004 | Shiozaki et al. |
| 2004/0168877 A1 | 9/2004 | Drager et al. |
| 2005/0189194 A1 | 9/2005 | Lindauer et al. |
| 2005/0196297 A1 | 9/2005 | Baumgartner et al. |
| 2006/0042902 A1 | 3/2006 | Boyer |
| 2009/0084650 A1 | 4/2009 | Hennessy et al. |
| 2009/0101463 A1 | 4/2009 | Hennessy et al. |
| 2009/0160589 A1 | 6/2009 | Krafft |

FOREIGN PATENT DOCUMENTS

| | | |
|---|---|---|
| DE | 3148872 A1 | 6/1983 |
| DE | 3243967 A1 | 5/1984 |
| DE | 3823871 A1 | 1/1990 |
| DE | 3941834 A1 | 6/1991 |
| DE | 4011528 A1 | 10/1991 |
| DE | 19842343 A1 | 3/2000 |
| DE | 19940099 A1 | 3/2001 |
| DE | 10219872 A1 | 11/2003 |
| DE | 102007037733 A1 | 2/2008 |
| EP | 0562226 A1 | 9/1993 |
| EP | 1378677 A2 | 1/2004 |
| GB | 2 374 124 A | 10/2002 |
| WO | WO 94/28326 A1 | 12/1994 |
| WO | WO 2007/016493 A1 | 2/2007 |
| WO | WO 2007/016494 A1 | 2/2007 |
| WO | WO 2009/030574 A1 | 3/2009 |

OTHER PUBLICATIONS

First Office Action from Chinese Application Serial No. 201080052017.1; mailed Feb. 27, 2014, 28 pages.

* cited by examiner

INTEGRATED VISCOUS CLUTCH

BACKGROUND

The present invention relates to viscous clutches.

Viscous clutches are used in a wide variety of automotive fan drive applications, among other uses. These clutches employ relatively thick silicon oil (generally called shear fluid or viscous fluid) for the selective transmission of torque between two rotating components. It is possible to engage or disengage the clutch by selectively allowing the oil into and out of a working area of the clutch located between input and output members (e.g., between an input rotor and an output housing). A valve is used to control the flow of the oil in the working area between the input and the output. Recent clutch designs have been employed that allow the oil to be stored in the rotating input portion of the clutch while the clutch is disengaged, in order to keep kinetic energy available to the oil to allow rapid engagement of the clutch from the off condition. This also allows the clutch have a very low output speed (e.g., fan speed) while in the off position. It has also become common for the clutch to be controlled electrically. This has been done to increase the controllability of the clutch, and to also have the clutch capable of responding to multiple cooling needs in a vehicle. Some of the possible cooling needs are coolant temperature, intake air temperature, air conditioning pressure, and oil temperature.

Viscous clutches have been used in the past as a separate device installed on a rotating pulley on the engine front. Rotational inputs to the clutch have been traditionally been engine crankshafts and water pumps. During the past decade, cooling requirements have been increasing as a result of increasingly stringent engine emission reduction requirements. During this time, the use of a belted pulley has become a more common method of providing an input to the fan clutch, with the belted pulley (synonymously called a sheave) capable of increasing the fan speed in order to obtain more cooling air flow for a vehicle's heat exchanger(s). The belted drive is desirable due to its simplicity, low cost and ease of obtaining the desired speed. Due to the rotational input to the fan clutch being separated from the water pump or crankshaft, it is possible for the cooling system engineer to choose the exact fan speed required to provide the necessary and desired cooling for a given application.

In a typical belted fan clutch arrangement, a drive hub assembly is mounted on the engine face. The drive hub consists of a pulley that is rotatably mounted on stationary journal bracket, with a bearing providing the rotational capability between the journal bracket and the pulley. FIG. 1 illustrates a prior art viscous clutch 10 mounted to a drive hub assembly 12. As can be seen in FIG. 1, the pulley and hub assembly 12 are a separate system, and the clutch 10 is mounted to a shaft 14 secured to the pulley 16, which in turn is rotatably mounted on a stationary journal bracket 18 by bearing 20. The clutch 10 is configured as described in U.S. Patent Application Pub. Nos. 2009/0084650, 2009/0101463 and 2010/0140040. The fan (not shown) can be mounted on either the rear side or the front side of the viscous clutch 10 shown in FIG. 1. Example air flow for the system shown in FIG. 1 is from the right side to the left side of the drawing, though could have a different orientation in further embodiments. An electrical interface 22 is resident between the clutch 10 and the pulley 16 on the engine side of a fan (not shown) attached to the clutch 10, downstream in the path of the air, so that the electrical interface 22 cannot be drawn into the fan. Electrical power is delivered to the clutch 10 by means of an electromagnet coil 24 that is rotationally fixed. Magnetic flux from the stationary electromagnet coil 24 can be transmitted to rotating components of the clutch 10 without any wear components (i.e., without slip rings, brushes, or the like). Because the electromagnet coil 24 is stationary and the input shaft 14 for the clutch 10 rotates, the coil 24 must be mounted on a bearing 26. Typically, the bearing 26 is a single row deep groove ball bearing which has been chosen to minimize its width and cost. The use of a single row bearing also necessitates great care in the attachment of the electrical interface 22 to the engine. Any side loading on the wires of the electrical interface 22 can result in shortened bearing life or wire failures. The use of the external electromagnet coil 24 necessitates getting the magnetic flux from the outside of the clutch 10 to the inside where a control valve is used to control the flow of oil in the clutch 10 to provide for desired selective engagement.

The present inventors have discovered a way to combine a drive hub assembly with a viscous clutch in order to provide a high value package for cooling system designers. According to the present invention, it is possible to eliminate components and improve the function of the drive. Accordingly, the present invention provides an alternative viscous clutch design to those of the prior art.

SUMMARY

In one aspect, a viscous clutch according to the present invention includes a stationary journal bracket defining a mounting shaft, an output member rotatably supported on the mounting shaft about an axis, an input member rotatably supported on the mounting shaft about the axis, and a working chamber defined between the input member and the output member to selectively transmit torque therebetween when a shear fluid is present. The mounting shaft extends axially through the viscous clutch from a front face of the viscous clutch to a rear face of the viscous clutch, with the rear face defining a mounting surface for mounting the viscous clutch at a mounting location. The front and rear faces are located at opposite sides of the viscous clutch and face in opposite directions.

In another aspect, the clutch of the present invention includes a first bearing set that supports the input member relative to the mounting shaft and a second bearing set that supports the output member relative to the mounting shaft, with the first and second bearing sets being spaced apart. The working chamber and the electromagnetic coil are both axially positioned within a space located in between the first bearing set and the second bearing set.

In yet another aspect, the clutch of the present invention has the electromagnetic coil positioned in a reservoir for the shear fluid, and the electromagnetic coil encircles the shaft and is supported by the mounting shaft.

While the above-identified drawing figures set forth several embodiments of the invention, other embodiments are also contemplated, as noted in the discussion. In all cases, this disclosure presents the invention by way of representation

DETAILED DESCRIPTION

The present invention is a viscous clutch assembly that allows for favorable packaging, power consumption and support for the system, and is suitable for use as a fan clutch in automotive applications. In general, the clutch (or drive) includes a mounting shaft (synonymously called a journal bracket) that can extend along an axial length of the clutch between front and rear faces. The mounting shaft can be used for several purposes in the design including providing support for a fan, housing, rotor, pulley (synonymously called a sheave) and an electromagnetic coil, providing a conduit path for electric control wires, and also optionally providing part of a magnetic flux circuit used for valve actuation. The combination of all of these functions in the mounting shaft allows for a very compact design and the elimination of a significant number of components when compared to a conventional viscous clutch and hub arrangement. Furthermore, the clutch of the present invention allows the electromagnetic coil to be positioned about the mounting shaft and inside the reservoir, which allows for a relatively small and efficient coil with relatively little magnetic loss during clutch operation, as well as a relatively small armature in an associated valve assembly that moves in response to flux from the coil. Such a coil arrangement also promotes a relatively compact overall clutch package. Moreover, in one embodiment, the clutch of the present invention allows for the working chamber, rotor and electromagnetic coil to be arranged in between (measured in the axial direction) bearing sets that support the housing and fan on the one hand and the pulley and rotor on the other. Those bearing sets can be aligned with the fan and the pulley in a manner that reduces overhung loads and provides desirable loading on the respective bearing sets. The present application claims priority to U.S. Provisional Patent Application Ser. No. 61/261,965, which is hereby incorporated by reference in its entirety.

Figure 1:
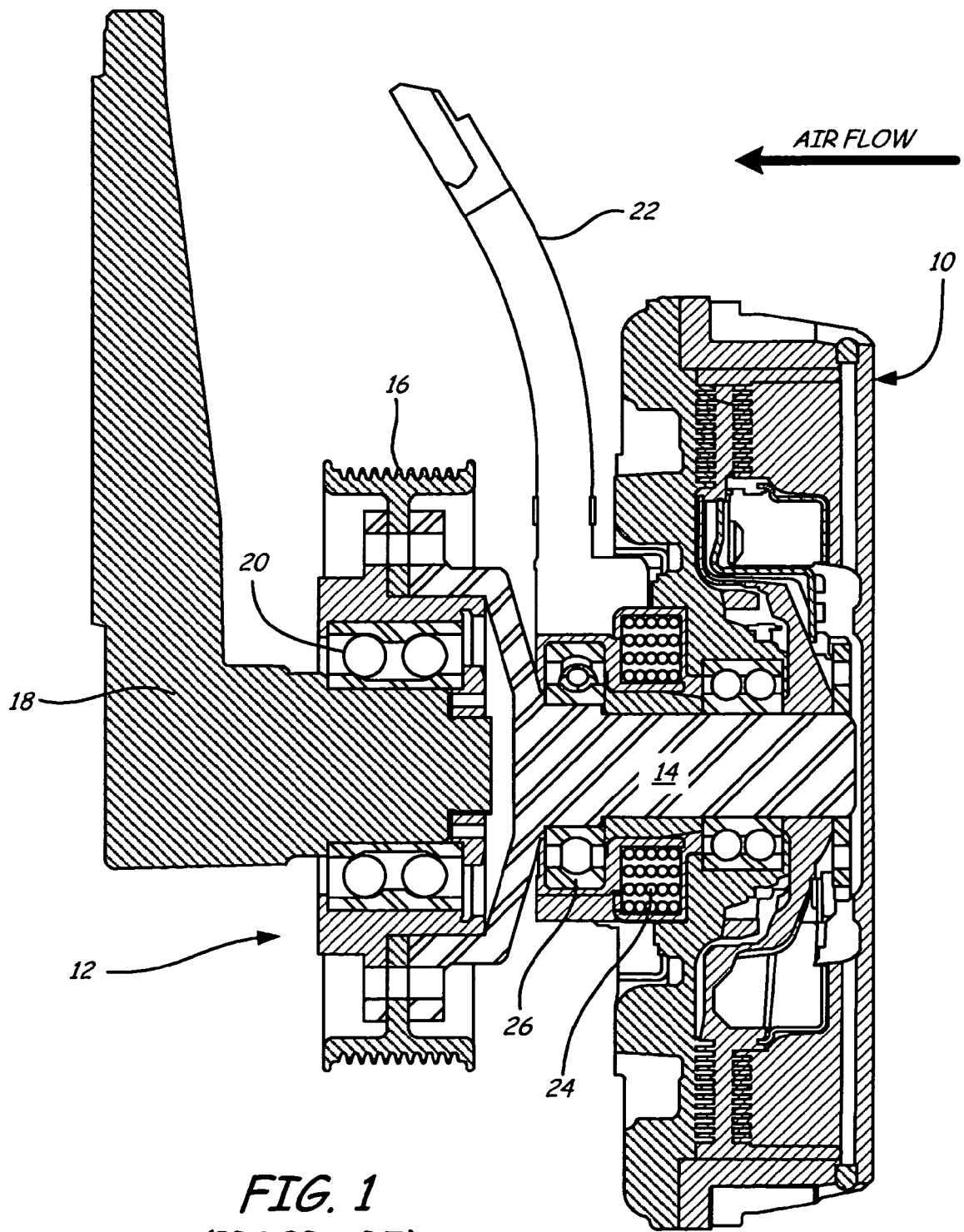
FIG. 1 is a cross-sectional view of a prior art viscous clutch and drive hub assembly.
Figure 2:
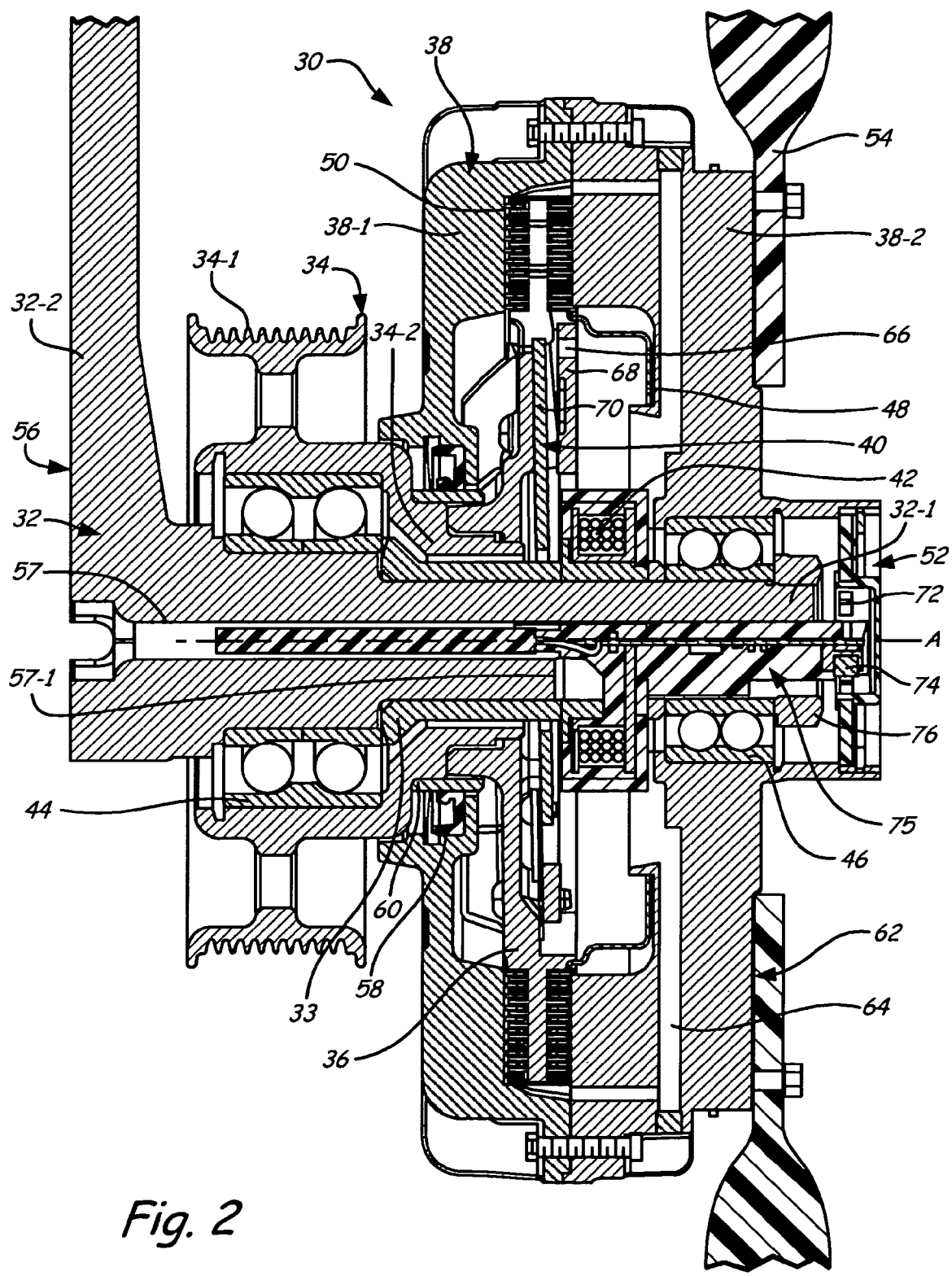
FIG. 2 is a cross-sectional view of an embodiment of a clutch according to the present invention.

FIG. 2 is a cross section view of one embodiment of a clutch 30, which includes a journal bracket (or mounting shaft) 32, a spacer 33, a pulley 34, a rotor 36, a two-part housing 38, a valve assembly 40, an electromagnetic coil 42, a first bearing set 44, a second bearing set 46, a reservoir 48, a working chamber 50, a cap assembly 52, and an output structure (e.g., fan) 54. The clutch 30 defines an axis of rotation A.

The journal bracket (or mounting shaft) 32 is a stationary (i.e., non-rotating) component that is secured to a mounting location, such as an engine block in a vehicle's engine compartment. It should be understood that while described as being "stationary" the journal bracket 32 can be installed within a moving vehicle, and the term "stationary" is used herein in relation to the mounting location. In the illustrated embodiment, the journal bracket 32 includes an axially extending shaft portion 32-1 and a generally radially extending flange portion 32-2. Moreover, in the illustrated embodiment the spacer 33 has a sleeve-like or generally cylindrical configuration and is positioned around and upon the shaft portion 32-1 and coaxial with the axis A. One end of the spacer 33 can abut a coil assembly that includes the electromagnetic coil 42 (see FIG. 3) and an opposite end of the spacer 33 can abut the first bearing set 44. The spacer 33 can be made of a magnetic flux conducting material such as steel.

The journal bracket 32 defines a rear face 56 of the clutch 30, which is positioned at the mounting location (i.e., at the engine side of the clutch 30). A conduit 57 is defined through the journal bracket 32, and can extend along substantially the entire length of the shaft portion 32-1. As illustrated, the conduit 57 is coaxially aligned with the axis A. The journal bracket 32 is structurally functional, and in some embodiments can also be magnetically functional. Suitable methods of manufacturing the journal bracket 32 include casting it from metallic material such as iron or steel. In a preferred embodiment, the journal bracket 32 is cast from ductile iron and then machined.

The pulley (or sheave) 34 is rotatably supported on the shaft portion 32-1 of the journal bracket 32, and is configured to accept rotational input from a belt (not shown). In the illustrated embodiment, the pulley 34 is positioned adjacent to the flange portion 32-2 of the journal bracket 32. Moreover, in the illustrated embodiment, the pulley 34 encircles the shaft portion 32-1 of the journal bracket 32 and is rotatably mounted on the shaft portion 32-1 by the first bearing set 44, which can be axially aligned with a belt engagement portion 34-1 of the pulley 34. A size (i.e., diameter) of the belt engagement portion 34-1 can be selected to help provide a desired rotational input speed to the clutch 30, as will be understood by persons of ordinary skill in the art. A lateral portion 34-2 of the pulley 34 extends generally axially forward from the belt engagement portion 34-1. In one embodiment, the pulley 34 can be cast from a metallic material such as iron or steel, and then machined. In an alternative embodiment, the pulley 34 can be spun formed (i.e., machined) and attached to a separate hub section (not shown) made from a casting.

The rotor 36 is attached to the lateral portion 34-2 of the pulley 34. In one embodiment, a threaded connection is provided between the rotor 36 and the lateral portion 34-2 of the pulley 34. As shown in FIG. 2, the rotor 36 is generally disc or annularly shaped, and is positioned to encircle the shaft portion 32-1 of the journal bracket 32, extending generally radially outward. The rotor 36 can include a number of concentric annular ribs on both its front and rear sides near an outer diameter portion in a conventional arrangement. One or more fluid openings can be formed through the rotor 36 in order to permit shear fluid to pass between front and rear sides of the rotor 36. Suitable radially extending channels or grooves can be formed in front or rear faces of the rotor 36 to provide space for the valve assembly 40. The rotor 36 can be formed by casting, and the ribs, openings and channels can be formed by machining.

In the illustrated embodiment, the rotor 36 carries the reservoir 48, which rotates with the rotor 36. The reservoir 48 can hold a supply of a shear fluid (e.g., silicon oil) for use by the clutch 30, with a majority of the shear fluid held in the reservoir 48 when the clutch 30 is disengaged. Because the rotor 36 is part of an input subassembly with the pulley 34, the rotor 36 always rotates whenever there is a rotational input to the pulley 34. Rotation of the rotor 36 in turn keeps the shear fluid under pressure while in the reservoir 48, allowing the shear fluid to be maintained at a relatively high level of kinetic energy to help facilitate quick engagement of the clutch 30. In one embodiment, the reservoir 48 can be attached to the rotor 36 with a swaged connection.

The housing 38 includes a base 38-1 and a cover 38-2, and forms an output or torque delivery portion of the clutch 30. The housing holds a seal 58 that can be sealingly engaged between the base 38-1 of the housing 38 and a wear sleeve 60 carried on the pulley 34, to help retain the shear fluid within the clutch 30. The wear sleeve 60 can be a generally cylindrical member made of a relatively hard material (e.g., suitable steel) in order to provide a durable wear surface against which the seal 58 can rest. In the illustrated embodiment, the wear sleeve 60 overlaps a joint or connection between the lateral portion 34-2 of the pulley 34 and the rotor 36. In alternative embodiments, the seal 58 and the wear sleeve 60 can each be positioned in other locations between input and output components of the clutch 30. Moreover, the wear sleeve 60 can be omitted entirely in further embodiments. A front face 62 of the clutch 30 is defined by the cover 38-2. The front face 62 is positioned opposite the rear face 56 of the clutch 30, and faces in an opposite direction. The cover 38-2 can include a return passage 64 to return shear fluid to the reservoir from the working chamber 50. In the illustrated embodiment, the cover 38-2 also provides the mounting for the output structure 54 (e.g., fan) to the front of the clutch 30 at the front face 62, though in alternative embodiments the output structure 54 could be mounted elsewhere (e.g., at an outer diameter of the housing 38 or at a rear face of the base 38-1). Furthermore, cooling fins can be provided on the exterior of the housing 38 to help dissipate heat to ambient air. In the illustrated embodiment, the housing 38 is rotatably supported on the shaft portion 32-1 of the journal bracket 32, and encircles the shaft portion 32-1. The second bearing set 46 can rotatably mount the cover 38-2 on the shaft portion 32-1 of the journal bracket 32, with the cover 38-2 in turn supporting the base 38-1 and the output structure 54. The second bearing set 46 can be axially aligned with the front face 62 of the clutch 30. The housing 38 can be cast from metallic material, such as die cast aluminum, and then machined. The base portion 38-1 and the cover portion 38-2 can be secured together with suitable fasteners.

The working chamber 50 (synonymously called a working area) is defined between the rotor 36 and the housing 38. The presence of the shear fluid in the working chamber 50 creates a fluid friction coupling between the rotor 36 and the housing 38 to engage the clutch 30 and transmit torque between input and output components. An instantaneous percentage of torque transmission can vary as a function of the amount of shear fluid in the working chamber 50. Generally, the shear fluid is delivered to the working chamber 50 from the reservoir 48 along a fluid path, and is returned to the reservoir 48 from the working chamber 50 through the return path 64. One or more suitable pumping structures can be included at or along the working chamber 50 to dynamically pump the shear fluid out of the working chamber 50 through the return path 64.

The valve assembly 40 can be attached to and carried by the rotor 36, and can be attached to the rotor 36 with suitable fasteners. In one embodiment, the valve assembly 40 is configured as described in U.S. Provisional Patent Application No. 61/375,173, entitled "Viscous Clutch Valve Assembly," filed Aug. 19, 2010, which is hereby incorporated by reference in its entirety. The valve assembly 40 is used to selectively cover and uncover an opening (or outlet bore) 66 from the reservoir 48. In some embodiments, the opening 66 can be defined in an orifice plate 68 that forms a wall of the reservoir 48. The opening 66 is a port that when uncovered (i.e., opened), allows the shear fluid to flow from the reservoir 48 to the working chamber 50 along the fluid path (which can traverse passages, grooves, channels, etc. in the rotor 36). The valve assembly 40 can be biased to the open position, for instance using a spring bias force. The valve assembly 40 includes an armature 70 located close to the axis A of the clutch 30 and in close proximity to the electromagnetic coil 42. As explained further below, energizing the electromagnetic coil 42 can move the armature 70 such that the valve assembly 40 covers the opening 66. It should be understood that nearly any known type of electromagnetically actuated valve assembly can be utilized in alternative embodiments.

The electromagnetic coil 42 can include a wound coil of high temperature insulated copper wire placed in a cup (e.g., a steel cup) used to direct the flux in the area of the armature 70. The coil 42 is rotationally fixed relative to the shaft portion 32-1. In the illustrated embodiment, the coil 42 encircles and is supported by the shaft portion 32-1 of the journal bracket 32, and can be assembled directly on the shaft portion 32-1. The coil 42 need not be mounted on any bearings, because the shaft portion 32-1 is rotationally fixed. Moreover, in the illustrated embodiment, the coil 42 is positioned inside the housing 38 and in the reservoir 48, that is, axially aligned with the reservoir 48 and positioned radially inward of an outer diameter of the reservoir 48. A flux circuit of the clutch 30 allows magnetic flux generated by the coil 42 to pass from the coil 42 to the armature 70 of the valve assembly 40 to the spacer 33 (and/or to the shaft portion 32-1 of the journal bracket 32) and back to the coil 42. When power is applied to the coil 42 during operation, the armature 70 is attracted toward the coil 42 due to the magnetic field that is produced.

The cover (or cap) assembly 52 can be secured to the cover 38-2 of the housing 38 at a front end of the shaft portion 32-1 of the journal bracket 32, and can be fitted with a speed sensor assembly for measuring an output speed of the clutch 30 (e.g., a fan speed). In the illustrated embodiment, the speed sensor assembly includes a target wheel 72 carried by and rotating with the cover 38-2 that is located in close proximity to a Hall Effect sensor 74, which detects each revolution of the target wheel 72. In the illustrated embodiment, the target wheel 72 is located within a part of the cover assembly 52 that is secured to a generally cylindrical portion of the cover 38-2 with a lock ring at the front of the clutch 30. In one embodiment, the target wheel 72 can be a metallic structure overmolded with a plastic material of the cover assembly 52. The Hall Effect sensor 74 is secured and rotationally fixed relative to the shaft portion 32-1 of the journal bracket 32. The target wheel 72 and the Hall Effect sensor 74 are cooperatively positioned relative one another (i.e., with the target wheel 72 in range of the Hall Effect Sensor 74) to allow the output speed of the housing 38 (and the output structure 54) to be measured relative to the rotationally fixed journal bracket 32. It should be noted that in further embodiments, other types of sensors can be used, or the sensor can be omitted entirely.

Figure 3:
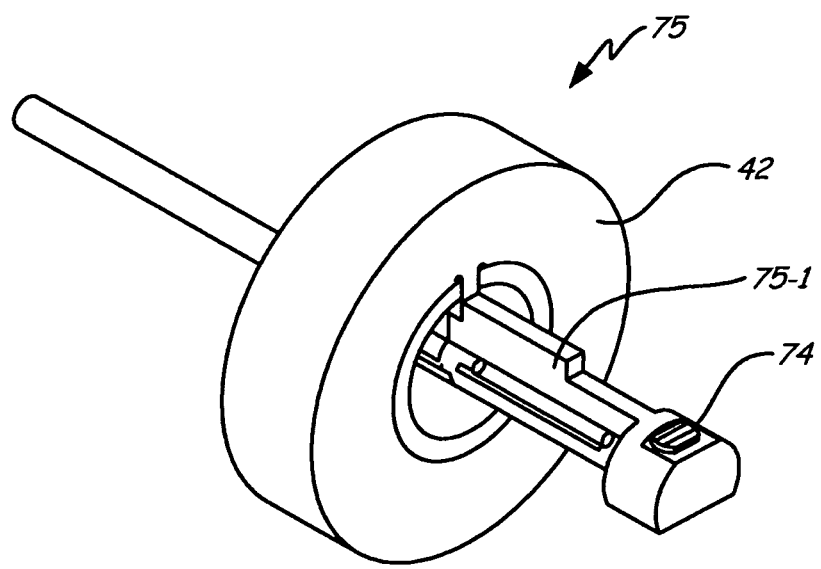
FIG. 3 is a perspective view of a coil cup assembly of the clutch of FIG. 2.

In the embodiment shown in FIG. 2, a coil cup assembly 75 is provided that carries the electromagnetic coil 42 and the Hall Effect sensor 74 together, and which further provides a connection point for wiring of the speed sensor assembly (namely, for the Hall Effect sensor 74) as well as for wires of the electromagnetic coil 42. FIG. 3 is a perspective view of a coil cup assembly 75 shown in isolation. As shown in FIG. 3, the coil cup assembly 75 includes a body portion 75-1 made from a polymer or other suitable material that can be overmolded over other components of the assembly such as the electromagnetic coil 42 and the Hall Effect sensor 74, as well as any necessary wiring. The coil cup assembly 75 can include an extension that can be inserted into the conduit 57 through the journal bracket 32 to help guide wiring for the clutch 30. As shown in FIG. 2, the conduit 57 can include a notch region 57-1 located generally to one side of the axis A, with the notch region 57-1 defining a suitable void to accommodate portions of the coil cup assembly 75. Such a configuration allows the coil cup assembly 75 to be mounted to the shaft portion 32-1 of the journal bracket 32 with the electromagnetic coil 42 and the Hall Effect sensor 74 both positioned simultaneously in a simple and efficient manner. From the coil cup assembly 75, electrical connection wires (not shown)

are able to traverse the remaining axial length of the journal bracket 32 through the conduit 57. The wires can exit the clutch 30 at the rear face 56 of the clutch 30 (i.e., at the engine side of the journal bracket 32) and can terminate with a plug assembly (not shown) for making an electrical connection to the vehicle engine's electrical system.

As shown in FIG. 2, a retaining member 76, such as a threaded nut, can be secured at the front end of the shaft portion 32-1 of the journal bracket 32 to axially retain the housing 38, the rotor 36, the pulley 34, the first and second bearing sets 44 and 46 and the coil cup assembly 75 on the shaft portion 32-1 of the journal bracket 32. Only a single retaining member 76 is necessary. The cover assembly 52 can fit over the retaining member 76.

A variety of alternative control schemes are possible for operating the clutch 30. In one embodiment, the electromagnetic coil 42 can be energized in a coarse on/off manner such that the valve assembly 40 tends to remain in either a fully open position (the default position) or a fully closed position when the coil 42 is selectively energized. In another embodiment, the coil 42 can be energized using pulse width modulated (PWM) signals from an electronic engine controller (not shown). PWM signals allow a dynamically variable average volume of shear fluid to flow out of the reservoir 48. Depending on the pulse width (i.e., duration) and frequency of PWM signals, the valve assembly 40 can variably adjust the amount of shear fluid allowed to pass out of the reservoir 48 through the opening 66 to the working chamber 50 over time. That is, the PWM signals cause the coil 42 to open and close the valve assembly 40, and the average amount of time that the valve assembly 40 is open (i.e., uncovering the opening 66) dictates the average amount of shear fluid that flows out of the reservoir 48. Greater pulse widths and/or greater frequencies of PWM signals will tend to close the valve assembly 40 more on average, allowing lower average volumes of shear fluid to pass to the working chamber 50. This PWM control scheme permits the clutch 30 to be operated at selectively variable speeds, such that the housing 38 (and attached output structure 54) can rotate at anywhere from 0% to approximately 100% of the rotational speed of the rotor 36 and the pulley 34, rather than merely in a coarse and binary on/off fashion.

The embodiment of the clutch 30 shown in FIG. 2 has the working chamber 50, the rotor 36 and the electromagnetic coil 42 arranged in between (measured in the axial direction) the first and second bearing sets 44 and 46. The first and second bearing sets 44 and 46 can be aligned with the output structure at the front face 62 of the clutch 30 and with the engagement portion 34-1 of the pulley 34, respectively, in a manner that reduces overhung loads and provides desirable balanced loading on the first and second bearing sets 44 and 46. Balanced bearing loading can help prevent damage and prolong bearing life.

Figure 4:
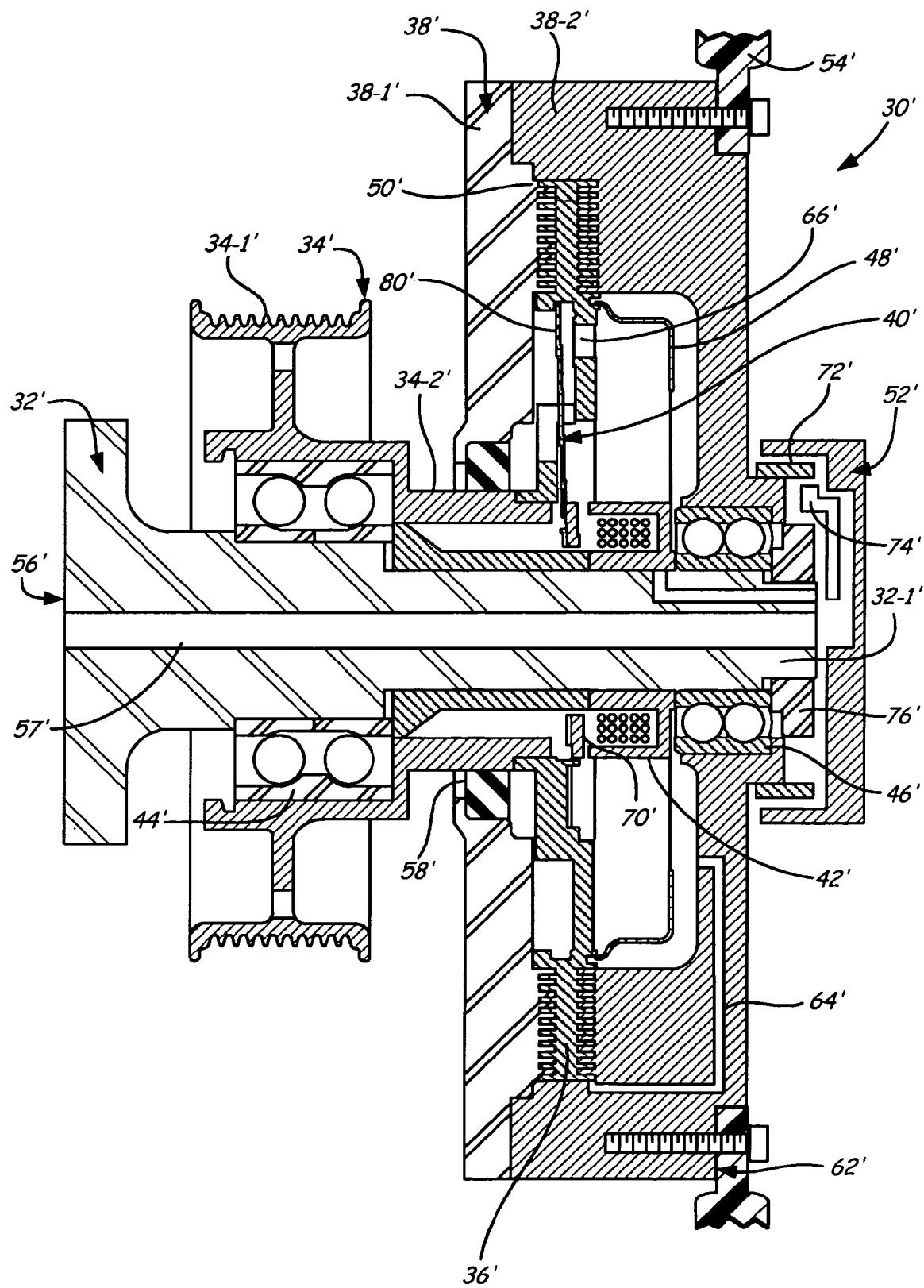
FIG. 4 is a cross-sectional view of another embodiment of a clutch according to the present invention.

FIG. 4 is a cross-sectional view of another embodiment of a clutch 30', which includes components similar to those of the clutch 30 described above identified in FIG. 4 with reference characters having a prime designation. In the embodiment illustrated in FIG. 4, the opening 66' is defined in the rotor 36' rather than an orifice plate (which is omitted), and the valve assembly 40' is pivotally secured to the rotor 36' with a conventional valve lever 80' that is moveable with the armature 70' to cover and uncover the opening 66' to control fluid flow. Moreover, the seal 58' rests directly on the lateral portion 34-2' of the pulley 34' and the wear sleeve is omitted. Furthermore, there is no coil cup assembly in the embodiment of FIG. 4. The cover assembly 52' is carried by the shaft portion 32-1' and includes the Hall Effect Sensor 74', with the target wheel 72' mounted on the cover 38-2'.

It should be recognized that the viscous clutch of the present invention provides numerous advantages and benefits. For example, the stationary shaft of the journal bracket traversing the entire axial length of the clutch assembly (between front and rear faces) has several important benefits over prior art viscous clutches. The shaft allows for direct mounting of the electromagnetic coil, either as a stand-alone coil or as part of a coil cup assembly. The coil can also have a relatively small diameter, which provides for relatively high efficiency because a relatively high number of turns in the coil are possible using a relatively minimal amount of wire material. Putting the coil on the inside of the clutch, inside the reservoir, also allows for the coil to be placed directly adjacent to the armature of the valve assembly, which allows for relatively high transfer of magnetic flux with a relatively low potential for magnetic loss. Mounting the coil directly to the shaft, with or without a coil cup assembly, also allows for simplified wiring and attachment to the electrical system of the engine. The shaft defines a conduit that provides a path for the wires to exit the clutch without the need for additional components such as wiring harnesses or rotational wiring interfaces (e.g., slip rings, brushes, or the like). The armature of the valve assembly is also located close to the center line of the clutch and can be made very small. This small size armature has correspondingly small mass and thus will respond relatively quickly to the magnetic flux generated by the coil and requires relatively small forces to move it between states (i.e., between positions where the valve assembly covers or uncovers the valve opening from the reservoir). The placement of the coil within the clutch assembly eliminates a need for magnetic flux-conducting inserts in any of the components and the resulting drawbacks of such inserts. Eliminating magnetic flux-conducting inserts in die cast components of the clutch minimizes the chance for eddy current losses in surrounding aluminum components (e.g., the housing) and also simplifies the casting process and the possibility of shear fluid leakage.

The stationary shaft further allows for a simple mounting point for the fan speed sensor. The location of the speed sensor at the front end of the shaft is simple and in close proximity to the fan mount. That location, being relatively close to the coil power supply wires, allows for a simple wiring combination. Use of a coil cup assembly allows wiring connections for both the electromagnetic coil and the speed sensor to be conveniently combined into a single assembly, allowing all the associated wiring to be positioned relative to the shaft simultaneously.

Furthermore, the shaft provides for a stable mounting surface for the fan support bearing. Allowing the fan to be supported directly to the engine (via the stationary shaft) on its own bearing allows for relative high dynamic stability of the clutch. The mounting arrangement also eliminates the presence of a large overhung load on the pulley bearings (present in a conventional viscous clutches), which can undesirably introduce large bending moments and vibrational inputs. The present invention thus allows the use of smaller and lower cost bearings in both bearing locations (compared to prior art viscous clutches) due to the simplified loading on each bearing. The embodiments of the clutch of the present invention shown in FIGS. 2 and 4 use conventional bearings, but the present invention opens the possibility to other options. Persons of ordinary skill in the art will appreciate further advantages and benefits of the present invention in view of the foregoing description and the accompanying figures.

Although the present invention has been described with reference to preferred embodiments, workers skilled in the art will recognize that changes may be made in form and detail without departing from the spirit and scope of the invention. For instance, the particular size and shape of clutch components according to the present invention can vary as desired for particular applications.

The invention claimed is:

1. A viscous clutch comprising:
a stationary journal bracket defining a mounting shaft;
an output member rotatably supported on the mounting shaft about an axis;
an input member rotatably supported on the mounting shaft about the axis;
a working chamber defined between the input member and the output member to selectively transmit torque therebetween when a shear fluid is present;
a valve assembly configured to control shear fluid flow along a fluid path defined between a reservoir and the working chamber; and
an electromagnetic coil configured to generate magnetic flux to control operation of the valve, wherein the electromagnetic coil is supported on the mounting shaft,
wherein the mounting shaft extends axially through the viscous clutch from a front face to a rear face, with the rear face of the viscous clutch defining a mounting surface for mounting the viscous clutch at a mounting location, the front and rear faces located at opposite sides of the viscous clutch and facing in opposite directions.

2. The viscous clutch of claim 1, wherein the input member comprises:
a rotor; and
a sheave secured to the rotor to accept rotational input from a belt.

3. The viscous clutch of claim 1 and further comprising:
a spacer coaxially positioned about the mounting shaft, wherein the spacer forms part of a flux circuit that links the electromagnetic coil and the valve assembly.

4. The viscous clutch of claim 1 and further comprising:
a first bearing set; and
a second bearing set, wherein the first and second bearing sets are spaced apart, and wherein the working chamber and the electromagnetic coil are both axially positioned within a space in between the first bearing set and the second bearing set.

5. The viscous clutch of claim 4 and further comprising:
a fan attached to the output member, wherein the second bearing set is axially aligned with the fan at or near the front face of the viscous clutch.

6. The viscous clutch of claim 1, wherein the reservoir is carried
by the input member for rotation therewith.

7. The viscous clutch of claim 1, wherein the front face is defined on the output member, and wherein the rear face is defined on the journal bracket.

8. The viscous clutch of claim 1 and further comprising:
a single retaining member engaged at a front end of the mounting shaft to axially secure the input member and the output member relative to the mounting shaft.

9. A viscous clutch comprising:
a stationary journal bracket defining a mounting shaft;
an output member rotatably supported on the mounting shaft about an axis;
an input member rotatably supported on the mounting shaft about the axis;
a working chamber defined between the input member and the output member to selectively transmit torque therebetween when a shear fluid is present,
a coil cup assembly body that carries both an electromagnetic coil and a first sensing element for sensing a speed of the output member relative to the mounting shaft; and
a cap assembly positioned at a front end of the mounting shaft at a front face of the viscous clutch, wherein the cap assembly includes a second sensing element positioned within range of the first sensing element,
wherein the mounting shaft extends axially through the viscous clutch from the front face to a rear face, with the rear face of the viscous clutch defining a mounting surface for mounting the viscous clutch at a mounting location, the front and rear faces located at opposite sides of the viscous clutch and facing in opposite directions.

10. A viscous clutch assembly comprising:
a rotor;
a reservoir carried by the rotor for rotation therewith;
a housing;
a working chamber defined between the rotor and the housing to transmit torque therebetween when a shear fluid is present;
a stationary shaft, wherein the shaft axially extends through portions of the housing and the rotor, and wherein the housing and the rotor are each rotatably supported on the shaft;
a valve configured to control shear fluid flow along a fluid path defined between the reservoir and the working chamber;
an electromagnetic coil configured to generate magnetic flux to control operation of the valve, wherein the electromagnetic coil is supported on the shaft, and wherein the electromagnetic coil encircles the shaft;
a first bearing set that supports the rotor relative to the shaft; and
a second bearing set that supports the housing relative to the shaft, wherein the first and second bearing sets are spaced apart, and wherein the working chamber and the electromagnetic coil are both axially positioned within a space located in between the first bearing set and the second bearing set.

11. The assembly of claim 10 and further comprising:
a sheave secured to the rotor to provide a rotational input to the viscous clutch.

12. The assembly of claim 11, wherein the first bearing set is axially aligned with the sheave.

13. The assembly of claim 12, wherein the second bearing set is axially aligned with a front face of the housing.

14. The assembly of claim 10 and further comprising:
a fan attached to a front face of the housing, wherein the second bearing set is axially aligned with the fan at the front face of the housing.

15. The assembly of claim 10 and further comprising:
a single retaining member engaged at a front end of the shaft to axially secure the housing and the rotor relative to the shaft.

16. The assembly of claim 10 and further comprising:
a coil cup assembly body that carries both the electromagnetic coil and a first sensing element for sensing an output speed of the housing member.

17. The assembly of claim 10, wherein the electromagnetic coil is positioned in the reservoir.

18. The assembly of claim 10, wherein the shaft extends axially through the viscous clutch from a front face to a rear face, with the rear face defining a mounting surface on the shaft for mounting the viscous clutch at a mounting location and the front face defining an output surface on the housing for attachment of a fan, the front and rear faces located at opposite sides of the viscous clutch and facing in opposite directions.

19. A viscous clutch including a rotor, a housing, a working chamber defined between the rotor and the housing, and a valve, the viscous clutch comprising:
- a sheave secured to the rotor to provide a rotational input to the viscous clutch;
- a reservoir carried by the rotor for rotation therewith, wherein the valve is configured to control shear fluid flow along a fluid path defined between the reservoir and the working chamber;
- a stationary shaft, wherein the housing, the rotor and the sheave are rotatably supported on the shaft;
- an electromagnetic coil configured to generate magnetic flux to control operation of the valve, wherein the electromagnetic coil is positioned in the reservoir, and wherein the electromagnetic coil encircles the shaft and is supported by the shaft.

20. The viscous clutch of claim 19 and further comprising: power supply wiring to deliver electrical power to the electromagnetic coil, wherein the power supply wiring extends through the shaft, and wherein the power supply wiring is stationary and does not include a rotational power transfer interface.

21. The viscous clutch of claim 19 and further comprising:
- a first bearing set that supports the sheave and the rotor on the shaft; and
- a second bearing set that supports the housing on the shaft, wherein the first and second bearing sets are spaced apart, and wherein the working chamber and the electromagnetic coil are both axially positioned within a space located in between the first bearing set and the second bearing set.

22. The viscous clutch of claim 21, wherein the first bearing set is axially aligned with the sheave, and wherein the second bearing set is axially aligned with a front face of the housing.

23. The viscous clutch of claim 19 and further comprising:
- a single retaining member engaged at a front end of the shaft to axially secure the housing and the rotor relative to the shaft.

24. The viscous clutch of claim 19 and further comprising:
- a coil cup assembly body that carries both the electromagnetic coil and a first sensing element for sensing an output speed of the housing.

25. The viscous clutch of claim 19, wherein the shaft extends axially through the viscous clutch from a front face to a rear face, with the rear face defining a mounting surface on the shaft for mounting the viscous clutch at a mounting location and the front face defining an output surface on the housing for attachment of a fan, the front and rear faces located at opposite sides of the viscous clutch and facing in opposite directions.

* * * * *